Aug. 15, 1961 N. V. BEAMAN 2,996,036

PAN GREASER

Filed Sept. 4, 1958 13 Sheets-Sheet 1

INVENTOR.

Norman V. Beaman

BY

Wood, Herron & Evans.

ATTORNEYS.

Aug. 15, 1961 N. V. BEAMAN 2,996,036

PAN GREASER

Filed Sept. 4, 1958 13 Sheets-Sheet 2

INVENTOR.
Norman V. Beaman
BY
Wood, Herron & Evans
ATTORNEYS.

INVENTOR.

Norman V. Beaman,

BY

Wood, Herron & Evans,

ATTORNEYS.

Aug. 15, 1961 N. V. BEAMAN 2,996,036

PAN GREASER

Filed Sept. 4, 1958 13 Sheets-Sheet 4

INVENTOR.

Norman V. Beaman

BY Wood, Herron & Evans,

ATTORNEYS.

Aug. 15, 1961 N. V. BEAMAN 2,996,036

PAN GREASER

Filed Sept. 4, 1958 13 Sheets-Sheet 5

INVENTOR.
Norman V. Beaman
BY
Wood, Herron & Evans
ATTORNEYS.

Aug. 15, 1961 N. V. BEAMAN 2,996,036

PAN GREASER

Filed Sept. 4, 1958 13 Sheets-Sheet 6

INVENTOR.
Norman V. Beaman
BY
Wood, Herron & Evans
ATTORNEYS.

PAN GREASER

Filed Sept. 4, 1958 13 Sheets-Sheet 7

INVENTOR.
Norman V. Beaman
BY
Wood, Herron & Evans
ATTORNEYS.

Aug. 15, 1961 N. V. BEAMAN 2,996,036

PAN GREASER

Filed Sept. 4, 1958 13 Sheets-Sheet 8

INVENTOR.
Norman V. Beaman
BY
Wood, Herron & Evans
ATTORNEYS.

INVENTOR.
Norman V. Beaman
BY
Wood, Herron & Evans
ATTORNEYS.

Aug. 15, 1961 N. V. BEAMAN 2,996,036

PAN GREASER

Filed Sept. 4, 1958 13 Sheets-Sheet 10

INVENTOR.
Norman V. Beaman
BY
Wood, Herron & Evans
ATTORNEYS.

INVENTOR.
Norman V. Beaman
BY
Wood, Herron & Evans
ATTORNEYS.

INVENTOR.
Norman V. Beaman.
BY
Wood, Herron & Evans.
ATTORNEYS.

PAN GREASER

Filed Sept. 4, 1958

INVENTOR.
Norman V. Beaman.
BY
Wood, Herron & Evans.
ATTORNEYS.

2,996,036
Patented Aug. 15, 1961

2,996,036

PAN GREASER

Norman V. Beaman, Whittier, Calif., assignor to The Cleveland Automatic Machine Company, Norwood, Ohio, a corporation of Delaware Filed Sept. 4, 1958, Ser. No. 759,041
11 Claims. (Cl. 118—2)

This invention relates to bakery equipment and is particularly directed to a novel machine for greasing baking pans by means of a grease spray projected from rapidly rotating discs. In my copending patent application for "Pan Greasing Machine," Serial No. 547,149, filed November 16, 1955, now Patent No. 2,903,998, I have disclosed a machine for greasing cake pans using rapidly rotating atomizing discs. The present application is directed to improvements upon the machine shown in that earlier application.

Pan greasing machines of the type disclosed in the present application are adapted for use in commercial bakeries. In such bakeries, it is common practice to bake sweet goods, and the like, in multiple cavity pan units, i.e., a number of individual pans, for example 24, are joined together to form a single large unit having a number of dough receiving pockets or cavities. Prior to the insertion of dough into the cavities of such pans, it is conventional to coat the pans with a coating of grease, such as vagetable oil, beeswax, or mineral oil, to prevent the dough from sticking to the pan. Such pan greases are relatively viscous and have in the past caused substantial difficulty in the operation of pan greasing machines of the type utilizing air operated spray apparatus. Among the principal difficulties encountered with such air nozzle type spray devices is that the nozzle frequently clogs due to the presence of crumbs and other foreign particles in the grease. A second common difficulty has been that the grease machine provided a very uneven coating of grease on the pan and in order to insure an adequate coating on all portions of the cavity walls, particularly the corners, a substantial excess of grease had to be applied to the bottom of the pan. This excessive amount of grease is not only uneconomical, but also seriously impairs the quality of the baked goods since they tend to become soggy and burnt.

The principal object of the present invention is to provide a novel grease atomizing unit effective to evenly coat all portions of each pan cavity so that a thin uniform coating of grease can be placed over the walls of the entire cavity. The present greasing machine employs eight rapidly rotated conical spray discs which are angulated in both a vertical and horizontal plane. These discs atomize the grease forming a mist like cloud which is sprayed upwardly from the discs into the pan cavities as the pans are moved longitudinally over the discs. These discs are effective to project grease spray in both a forward and backward direction so that the rear and side walls, and corners of the pan cavities, receive the same uniform coating given to the bottom of the pan. Moreover, the conical discs of the present invention are of a unique configuration adapted to atomize the greate in a uniform, very fine mist free of any large droplets which might be thrown against the pan, leaving an excess local grease deposit.

Actual comparisons of operating results show that the present machine provides a fifty percent savings in the amount of grease required to grease a given number of pans. Moreover, the quality of the baked goods produced in pans greased by the present machine is markedly superior, since there are no burned or soggy portions caused by excessive grease deposits.

A second object of the present invention is to provide a greasing machine having a novel shutter construction for preventing escape of grease from the continuously rotating discs into the bakery. This shutter mechanism eliminates the need for an exhaust system while at the same time preventing any objectionable accumulation of grease on other equipment in the bakery. The present shutter mechanism is a double acting mechanism in that it is effective not only to prevent grease from escaping from the grease spray chamber, containing the rotating discs, during the return stroke of the reciprocating template, but also to prevent escape of grease on the forward stroke of the template when there is no pan placed on the template.

One of the advantages of the present shutter mechanism is that it is actuated directly by the pan advancing mechanism which also function to shift pans in a step by step movement through the machine from a loading station to the greasing station, a draining station, and finally a discharge station. The present shutter mechanism is of extremely simple construction and provides trouble free operation over extended periods of time.

A still further advantage of the shutter mechanism is that it not only effectively prevents the escape of grease, but also the present shutter mechanism cooperates with the novel spray discs of the present machine to provide an optimum grease coating on the pans. More particularly, as was explained above, the spray discs of the present machine are angulated both with respect to the vertical and with respect to the horizontal. Thus, the spray thrown from the discs is projected not only sideways, but also toward the front and rear of the pan cavities. The present shutter mechanism facilitates the use of such discs by providing a spray opening which is substantially wider in the direction of movement of the pans than is practical with a pivoted flap of the type shown in my earlier application.

In accordance with the present invention, the width of the spray opening is increased by the use of a pair of sliding shutters which extend across the spray machine beneath the template. When a pan is on the template, as the template advances over the spray opening, the forward shutter is separated from the rear shutter and is shifted ahead of the template exposing the template openings to the spray produced by the rotating discs. Subsequently, the rear shutter is shifted in uinson with the rear portion of the template and is then brought into abutment with the forward shutter at the end of the forward stroke. On the return stroke of the template, both shutters are shifted with the template to trap the grease spray. A shutter construction of this type allows the use of a much wider opening than is possible with a rotating shutter of the type shown in my copending application. Additionally, as is explained below, the longitudinal extent of the opening is further increased in the present machine by the use of an overtravel mechanism effective to shift the rear flap a distance further than the distance traveled by the template.

These and other objects and advantages of the present invention will be more readily apparent from a consideration of the following detailed description of the drawings illustrating a preferred embodiment of the invention.

Figure 1:
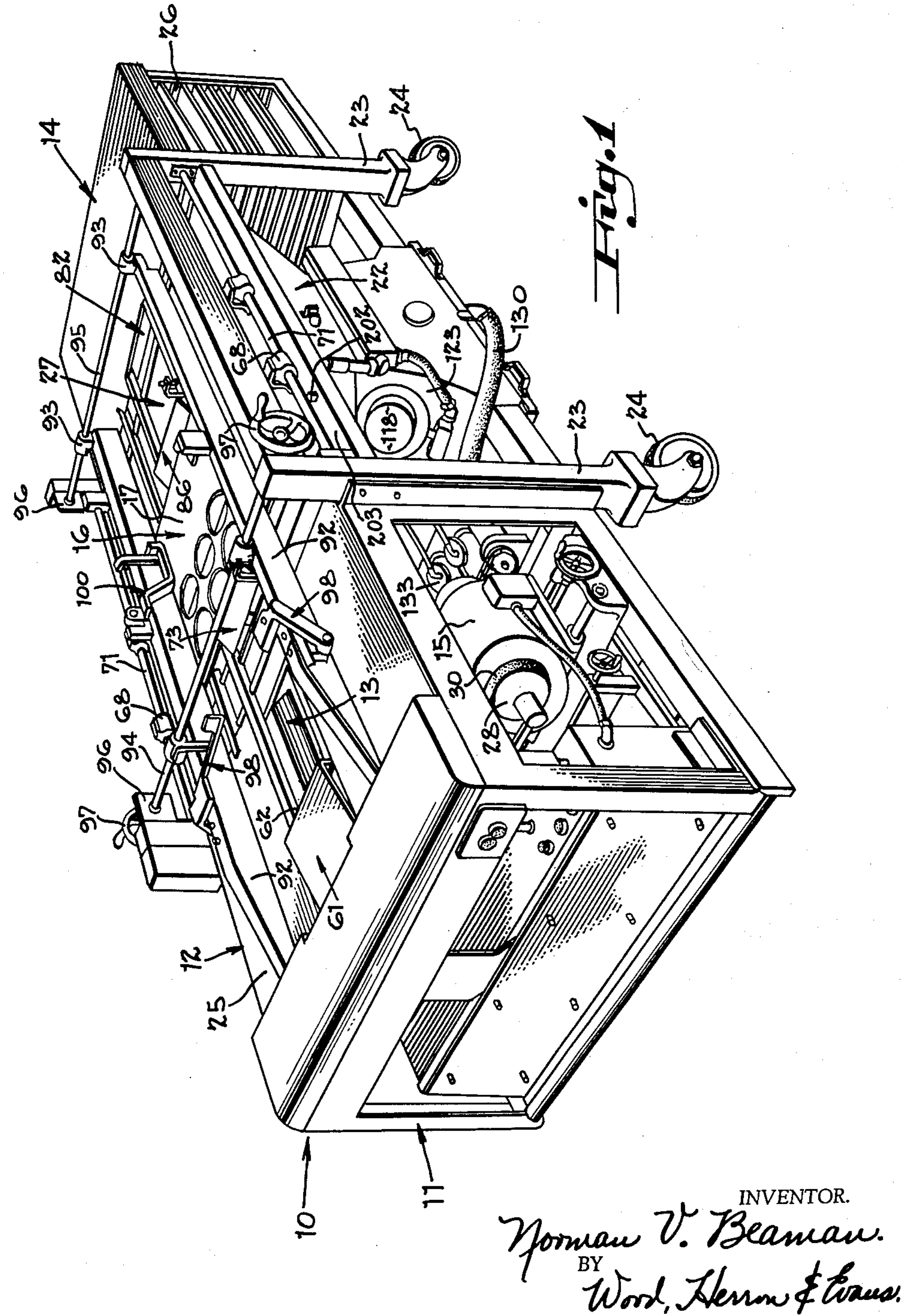
FIGURE 1 is a perspective view of a pan greasing machine constructed in accordance with the principles of the present invention.
Figure 2:
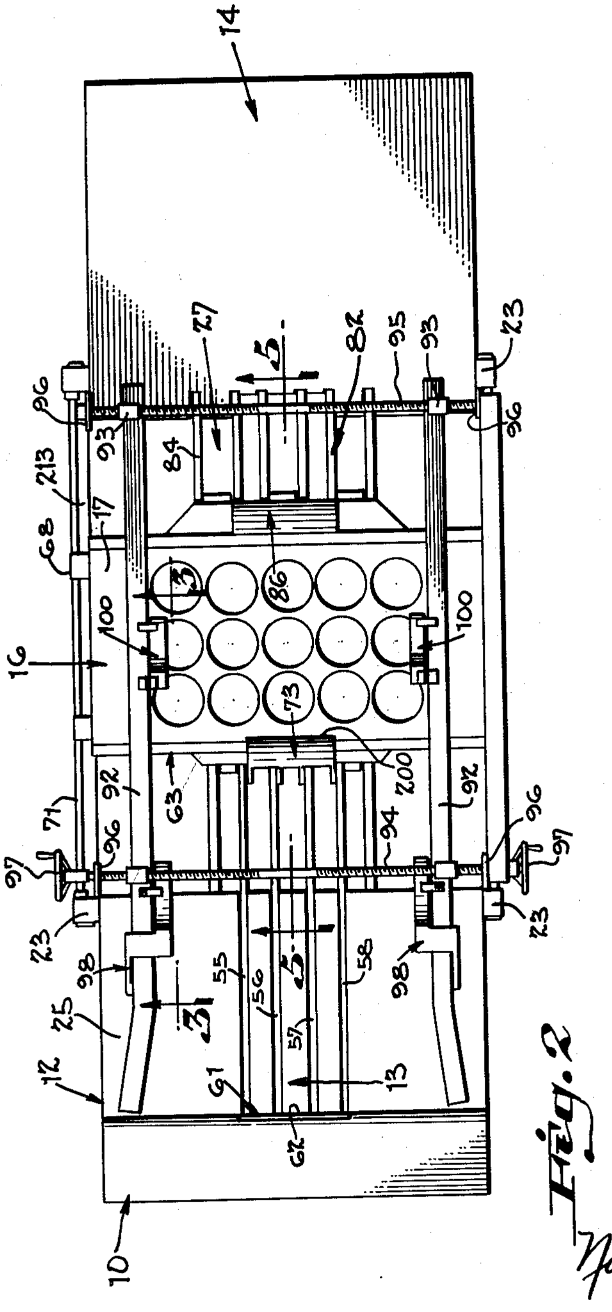
FIGURE 2 is a top plan view of the machine shown in FIGURE 1.

One preferred form of pan greasing machine 10 constructed in accordance with the principles of the present invention is shown in FIGURE 1. As there shown, the machine comprises a frame 11, one end 12 of which carries a pan loading station 13 and the opposite end of which carries a pan unloading table 14. The frame also supports a main drive motor 15 and a pan advancing mechnism indicated generally at 16 driven by the motor and effective to automatically advance inverted straps of pans through the machine from the loading station 13 to the discharge table 14. Pan advancing mechanism 16 includes a template 17 carried adjacent to the top of the machine for reciprocating movements over a greasing station 18 positioned adjacent to the center of the machine.

Figures 20, 21, 29:
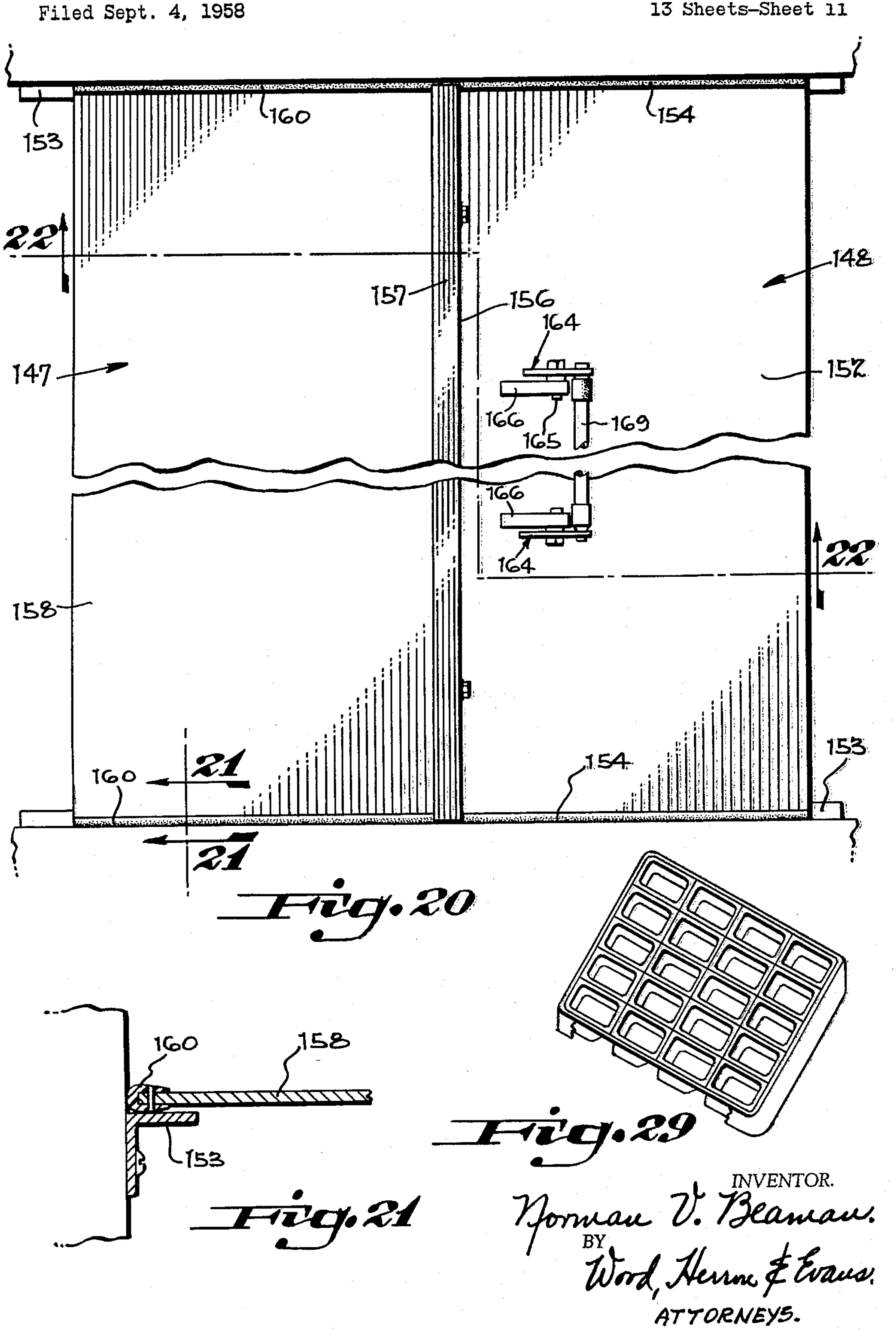
FIGURE 20 is a top plan view of the closure shutters.
FIGURE 21 is a cross-sectional view taken along line 21—21 of FIGURE 20.
FIGURE 29 is a perspective view showing a typical strap of baking pans adapted to be greased using the present machine.

Greasing station 18 is provided with two sets 20 and 21 of rotating discs, each set comprising four conical discs extending transversely of the machine. The two sets of discs are mounted in a housing 22 beneath the upper surface of the machine, the discs being effective to atomize grease applied to them and to project grease upwardly in the form of a very fine spray through the template 17 into the cavities of a plurality of baking pans joined to form a strap of pans, as shown in FIGURE 29.

More particularly, frame 11 is fabricated from a plurality of angle members, plates, and other suitable frame elements. The frame includes four legs 23, each of which carries a suitable wheel 24 so that the pan greasing machine can readily be moved from one part of the bakery to another. Frame 11 further carires a pan supporting table in the form of generaly rectangular plate 25 mounted at the forward end of the machine and extending approximately a third of the length of the machine.

At the discharge end of the machine, a pan unloading table 14, in the form of a second rectangular plate, is provided. The frame additionally supports a template rack 26 located at the discharge end of the machine beneath table 14. This rack includes a plurality of spaced support bars for supporting and storing a plurality of templates when not in use.

Pan advancing mechanism 16 is effective to shift pans in a step-by-step movement from pan loading station 13 over greasing station 18 and draining station 27 to the unloading table 14. As explained in greater detail below, the pan shifting mechanism also shifts template 17 in unison with the pans across greasing station 18 so that the rims and other areas of the pans are shielded from the sprayed grease and the grease is applied only to the pan cavities.

Figure 9:
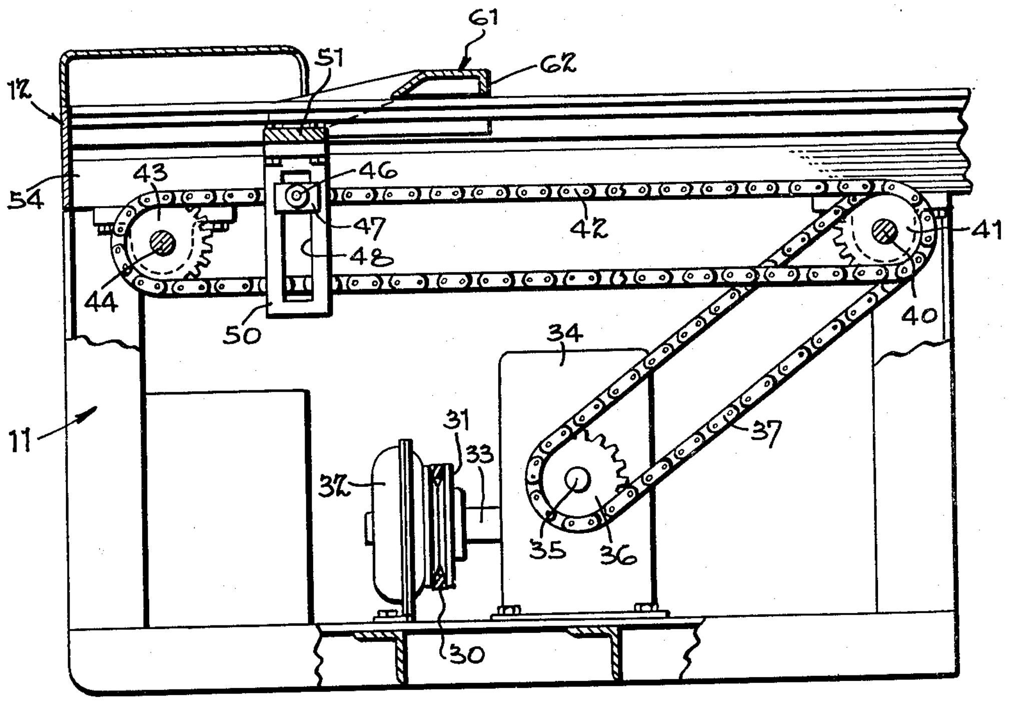
FIGURE 9 is a side view of the forward end of the machine partially broken away to show details of construction.
Figure 10:
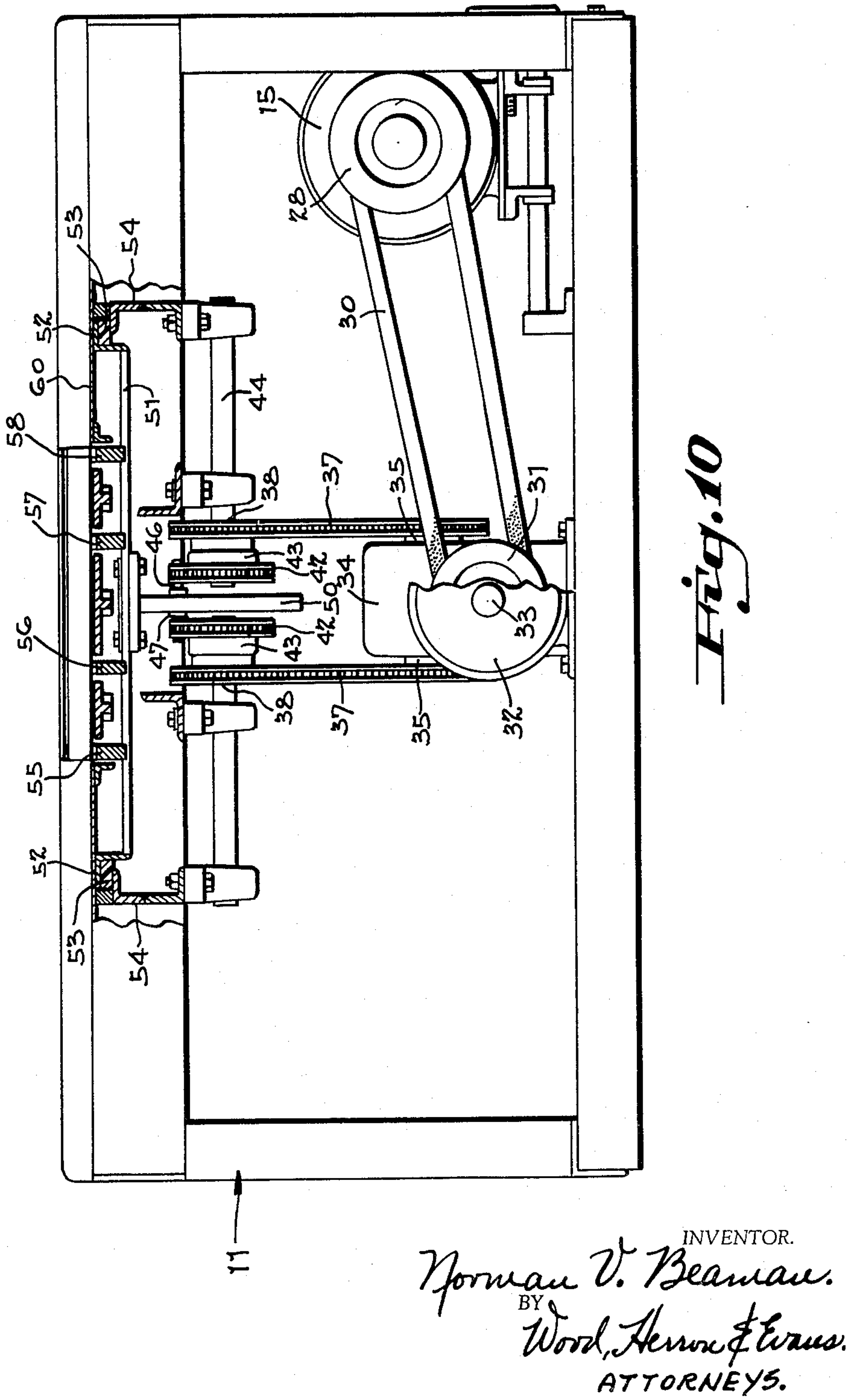
FIGURE 10 is an end view of the forward end of the machine partially broken away to show details of construction.
Figure 13:
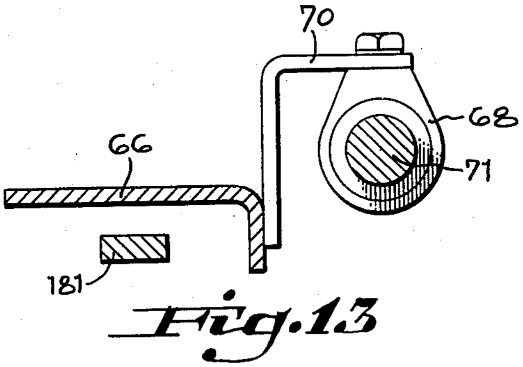
FIGURE 13 is a cross-sectional view taken along line 13—13 of FIGURE 4.

Pan advancing mechanism 16 is driven from a main driving motor 15. The shaft of motor 15 carries a pulley 28 which in turn supports a belt 30. Belt 30 also passes over a pulley 31 mounted upon a shaft of a fluid clutch unit 32. This fluid clutch is in turn interconnected through shaft 33 to a gear reduction unit 34. Gear reduction unit 34 has two output shafts 35 carrying sprockets 36 for driving chains 37. As is best shown in FIGURES 9 and 10, chains 37 are spaced apart and extend upwardly and rearwardly engaging with sprockets 38 mounted upon shafts 40. Shafts 40 also support sprockets 41 in driving engagement with a pair of spaced longitudinal chains 42, the forward end of chains 42 being supported by idler sprockets 43 mounted upon a cross shaft 44 disposed adjacent to the forward end 12 of the machine.

Each of the longitudinal chains 42 carries a chain block (not shown) which is bolted or otherwise secured to the chain for movement therewith; and is provided with an aperture for receiving a cross pin 46. The cross pin carries a slide block 47 provided with grooves for slidably engaging a vertical slot 48 in driving fork 50. This fork is bolted or otherwise secured to transverse bar 51, as is best shown in FIGURES 9 and 10. Transverse bar 51 is provided with two outwardly extending support flanges 52 resting upon nylon runners 53 bolted or otherwise secured to main longitudinal channels 54 of the machine frame. Transverse bar 51 also supports four longitudinally extending bars 55, 56, 57, and 58. These bars lie just below top panel 60. Transverse bar 51 also supports a first pan pushing member 61 having a vertical face 62 adapted to engage the rear edge of a strap of pans and advance the pans from the loading table to the greasing station.

Figure 4:
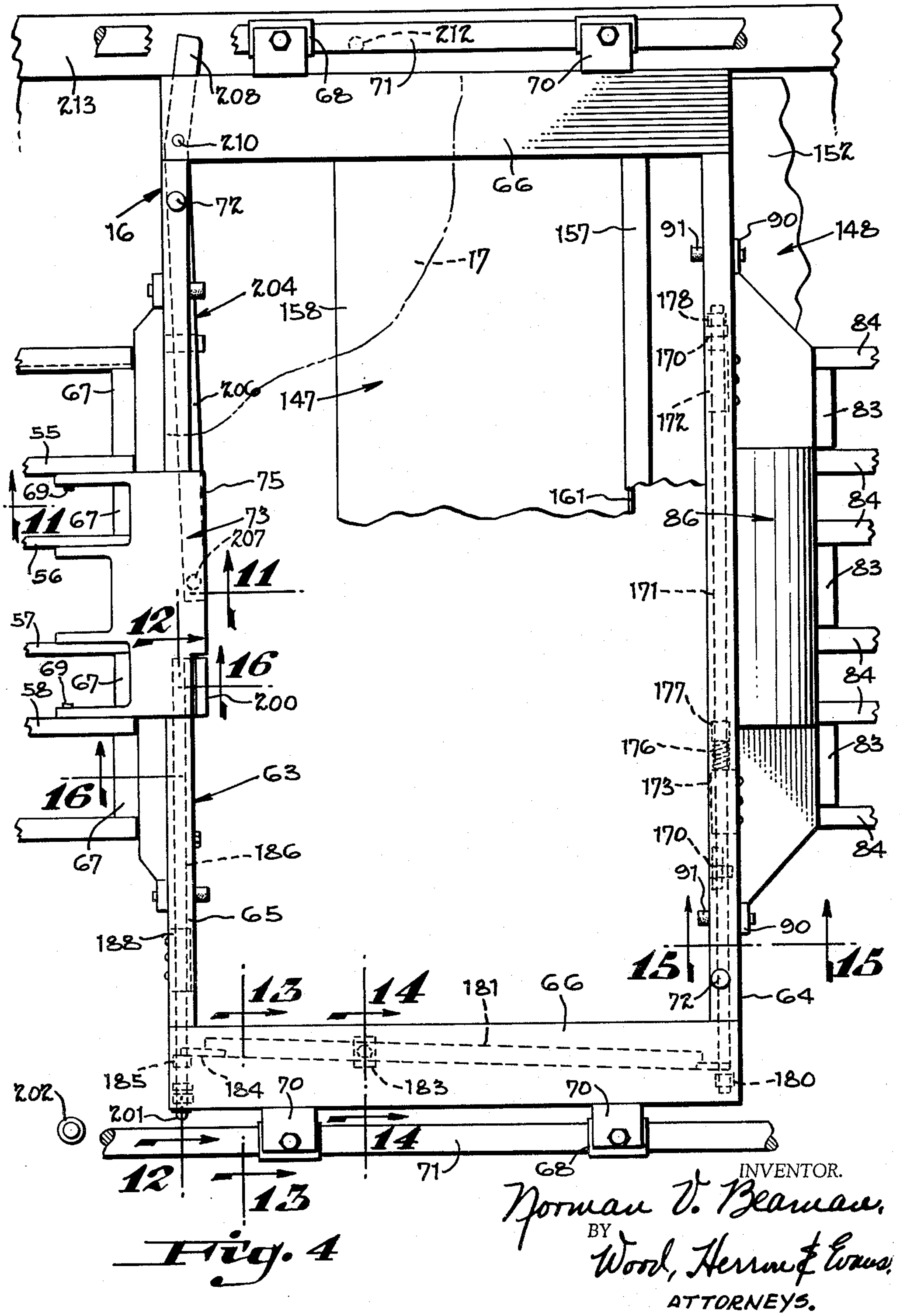
FIGURE 4 is a top plan view of the template carrying frame partially broken away to show details of construction.

The forward end of bars 55, 56, 57, and 58 are adapted for releasable engagement with a template carrying frame 63. More particularly, as is best shown in FIGURE 4, template frame 63 is generally rectangular and includes leading and trailing end members 64 and 65 and two longitudinal side members 66. Trailing end member 65 carries bosses 67 which are welded or bolted to the frame member and are provided with apertures for receiving pins, which pins also pass through apertures in the ends of bars 55—58 thereby securing the bars to the template carrying frame.

Template carrying frame 63 is mounted for longitudinal movements over the grease and draining stations indicated at 18 and 27 respectively. The frame is supported by means of four bearing sleeves 68 which are secured by means of brackets 70 to side members 66. Two bearing sleeves 68 are disposed at each side of the machine in slidable engagement with guide rods 71 carried by the legs 23 of the machine.

Figure 11:
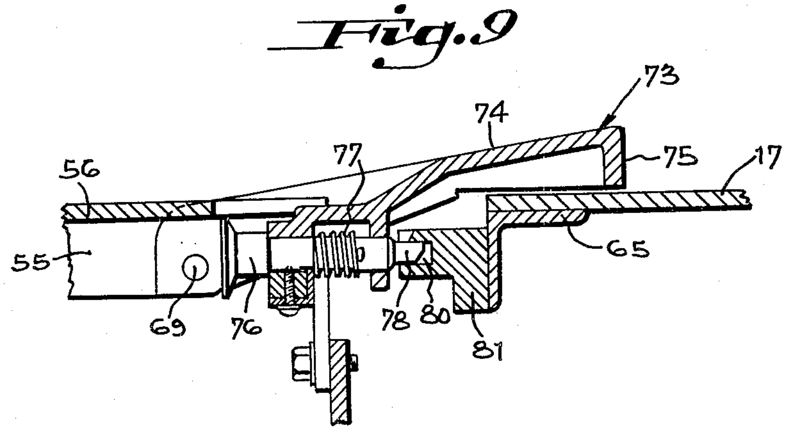
FIGURE 11 is a cross-sectional view taken along line 11—11 of FIGURE 4.

A template 17, formed of thin plate material and provided with a plurality of spaced apertures conforming in size and shape to the pan openings, is mounted over the open portion of template frame 63. Template 17 is positioned relative to the frame by means of two pins 72 mounted at opposite ends of leading and trailing cross bars 64 and 65 of the template frame. These pins extend upwardly and are adapted to be received in openings formed at corresponding points in the template. The trailing edge of the template carrying frame is provided with a second pan pushing member 73. This pan advancing member is of generally triangular configuration including an upwardly sloping surface 74 and a vertical face 75 adapted to engage and position a strap of pans resting upon template 17. As is best shown in FIGURES 4 and 11, pan engaging member 73 is pivotally secured to the forward ends of bars 55—58 by means of pivot pins 69.

During normal operation, the pan pusher 73 is locked in position by means of a latching rod 76. This latching rod is spring urged outwardly by means of a spring 77 in abutment with a shoulder formed on pushing plate 73 and a pin 78 formed on the latching rod. The nose of the latching rod is received within a recess 80 formed in a block 81 carried by the template frame. When it is desired to change templates, the latching rod is retracted against spring 77 permitting pushing member 73 to be pivoted upwardly about pin 69.

Figure 15:
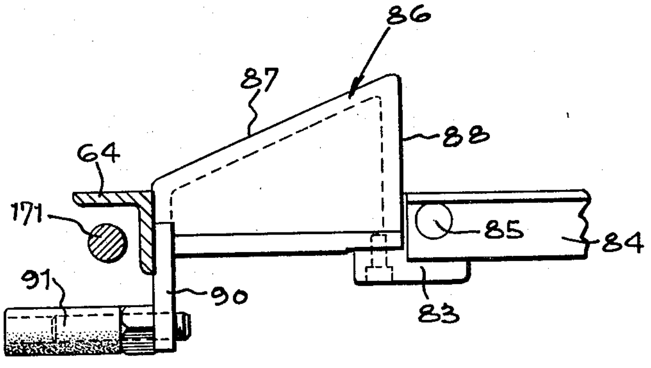
FIGURE 15 is a cross-sectional view taken along line 15—15 of FIGURE 4.

The discharge end of the template frame is adapted for securence to a pan discharge unit 82 in the same manner that the loading end of the template carrying frame is secured to the bars of the pan feeding mechanism. More particularly, leading edge 64 of the template carrying frame supports a plurality of sleeve members 83 provided with bores for receiving pins 85 (FIGURE 15) which pins also extend through suitable openings formed in longitudinal bars 84 of the discharge mechanism. Transverse member 64 also carries a third pan pushing member 86 of generally triangular configuration including an upwardly sloping face 87 and a vertical face 88. Transverse member 64, at the discharge end of the template frame, also supports two depending brackets 90, each of which carries a rearwardly extending bumper 91. These bumpers 91 are preferably formed of a plastic material, for example, a cylindrical sleeve of Teflon or nylon, press fitted over a pin which is threadably secured to bracket 90. The function of these bumpers 91 in the operation of the shutters is explained in detail below. Pan discharge mechanism 82 includes in addition to longitudinal bars 84 a transverse bar (not shown) which is identical with the transverse bar 51 at the landing station and includes flanges adapted to engage nylon runners carried by suitable longitudinal frame members (not shown).

It is to be understood that in operation of the device, template frame 63 is secured to bars 55—58 of pan advancing mechanism 16 and to longitudinal bars 84 of the pan discharge unit 82. Consequently, all three units are reciprocated in unison through the drive provided by motor 15 and chains 37 and 42. During reciprocating movement of these units, straps of pans are transferred from the pan advancing mechanism 16 to the template 17 and from the template 17 to the pan discharge mechanism 82 in the manner explained below. The straps of pans are advanced through the machine in an inverted position and are guided longitudinally of the machine by side guide members 92.

These guide members extend longitudinally of the machine and are carried by end sleeves 93 which threadably engage adjustment screws 94 and 95. Adjustment screws 94 and 95 are rotatably mounted in brackets 96 and hand wheels 97 are mounted upon the ends of screw 94 for turning that screw and adjusting the space between the guide members. A conventional chain drive (not shown) interconnects screws 94 and 95 so that both ends of the guide members are moved in and out in unison.

Figure 3:
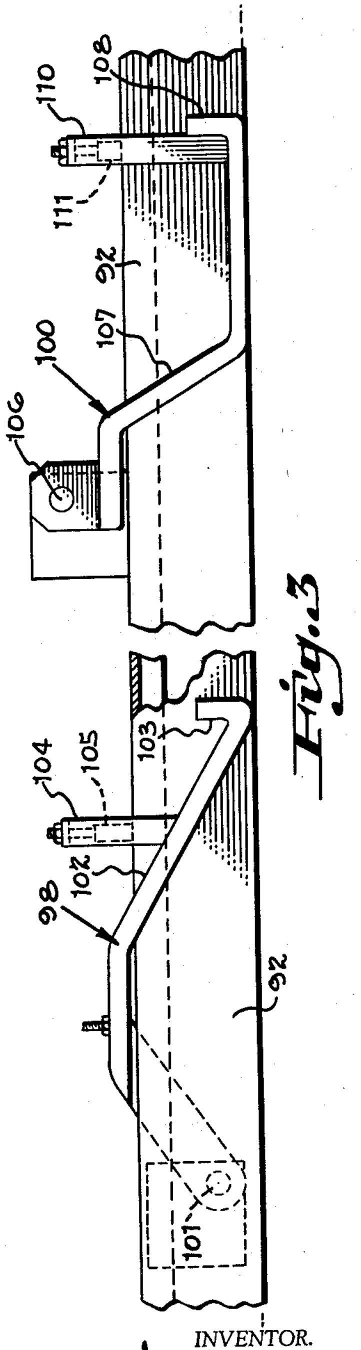
FIGURE 3 is a cross-sectional view taken along line 3—3 of FIGURE 2.

Side guide members 92 carry two sets of pan stops 98 and 100. Pan stops 98 are disposed intermediate the pan loading station 13 and greasing station 18 while stops 100 are disposed intermediate the pan greasing station 18 and draining station 11. Each of the pan stops 98 comprises an angular strap of metal which is pivotally mounted to a longitudinal guide 92 by means of a pivot pin 101. The pan stop includes a sloping portion 102 and a vertical upturned end portion 103. A bracket 104 is secured to sloping arm 102 and carries a resilient element 105 disposed to engage the upper edge of guide rail 92 when the stop member drops into the position shown in FIGURE 3. It will be appreciated that in operation the stop member pivots upwardly to allow a pan to pass under it, but prevents regressive movement of the pan upon retraction of the pan advancing mechanism.

Pan stops 100 are of generally similar construction and are pivotally mounted on the side rails by means of pivot pins 106. Stop 100 includes a sloping portion 107 and a vertical upstanding end portion 108. These stops also carry brackets 110 and resilient members 111 for engaging the top edges of side guide members 92.

The pan spraying mechanism is best shown in FIGURES 5–8, and 24. As there shown, grease is applied to the pans from a plurality of rotating flinging elements in the form of rotating conical discs 112. These discs are mounted in two groups, the groups being indicated generally by the numerals 20 and 21. The discs of each group are angulated in both a horizontal and vertical plane. However, the axes of rotation of the discs in each group are parallel, in a preferred embodiment these axes are elevated 25° from horizontal and are offset 23° from a transverse line through the machine. The discs of each group are also offset in a longitudinal direction from one another so that the discs overlap. All of the discs in both groups rotate in the same direction.

Figures 7, 8, 24:
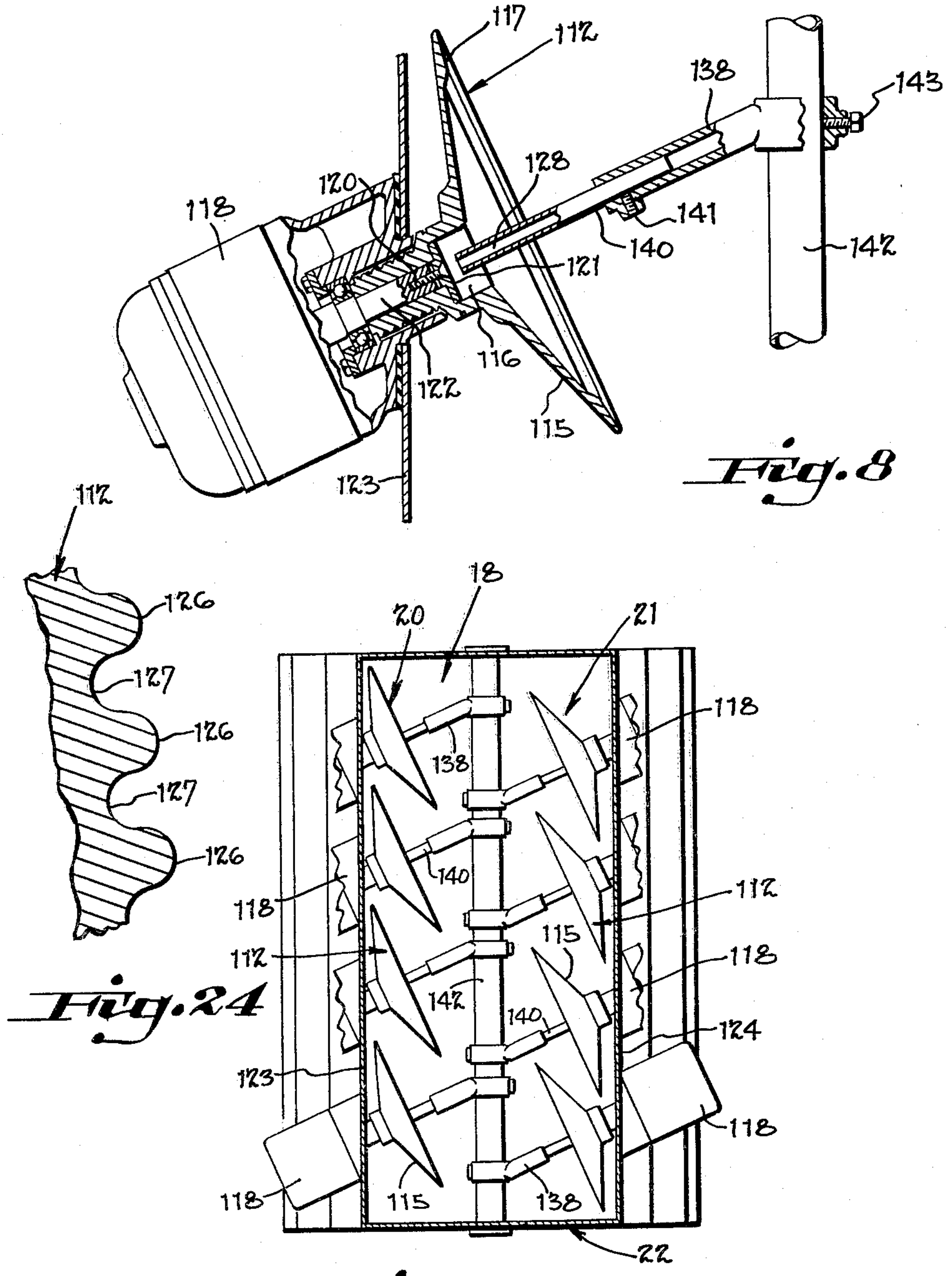
FIGURE 7 is a diagrammatic top plan view of the spray discs.
FIGURE 8 is an elevational view of a spray disc partially in section.
FIGURE 24 is an enlarged partial cross-sectional view of one of the spray discs.

As is best shown in FIGURE 8, each of the discs 112 comprises a generally conical plate like portion 115. The center of the disc includes a cylindrical well 116 and the periphery of the disc includes a bead or band portion 117. Each disc is provided with its own motor 118 and is mounted for rotation with the motor shaft by means of a screw 120 in engagement with a plate 121 disposed within well 116 and in threaded engagement with motor shaft 122. Motors 118 are mounted within the pan greasing machine in any siutable manner and are protected from grease spray by sloping walls 123 and 124 of the spray compartment housing 22.

As is shown in the greatly enlarged semi-diagrammatic view, 24, the conical inner face of each of the discs is rough. In production, this is accomplished by using a coarse cut during the final turning operation. Consequently, the face of each disc is provided with a plurality of alternating circular lands or ridges 126 and troughs 127. This particular configuration of spray discs is highly advantageous since it provides an extremely uniform grease flow free from any large drops. This uniformity of spray is due, in part, to central well 116 which receives grease from the end of tube 128. The grease which is supplied to the well is distributed about the periphery of the well by the centrifugal force associated with the high speed disc, the discs preferably being rotated in the neighborhood of 3500 r.p.m. As the grease flows outwardly along the conical surface of the disc, the rough surface, or ridges of the disc prevent any direct radial stream of grease from flowing outwardly along the disc; but rather provides an impedance, or resistance, to flow tending to cause the grease to flow or spread itself in a uniform manner over the face of the disc. The bead, or rim, of the disc also provides an impedance to radial flow at the periphery of the disc and further aids in obtaining a uniform stream.

Figure 5:
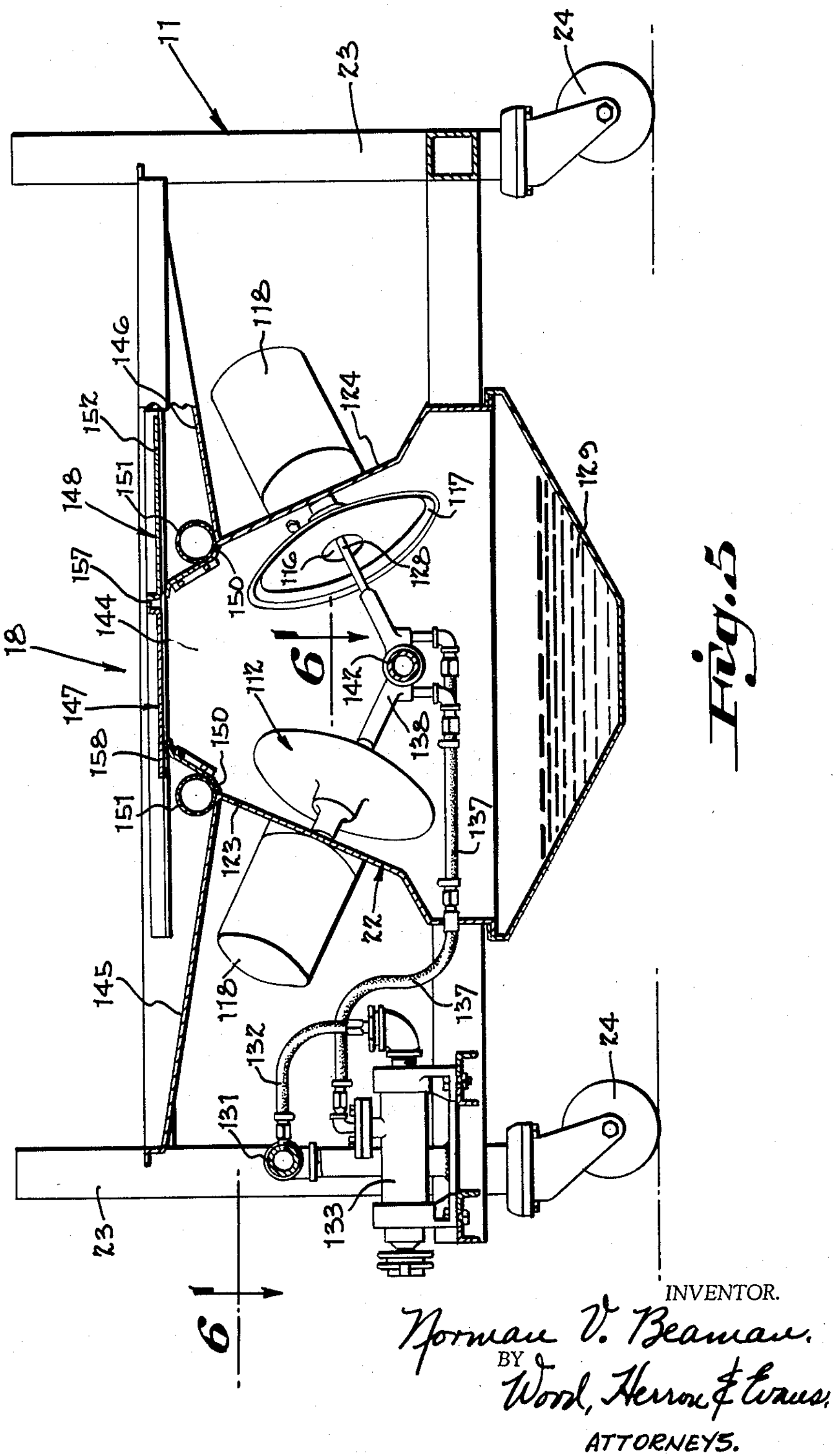
FIGURE 5 is a cross-sectional view taken along line 5—5 of FIGURE 2.
Figure 6:
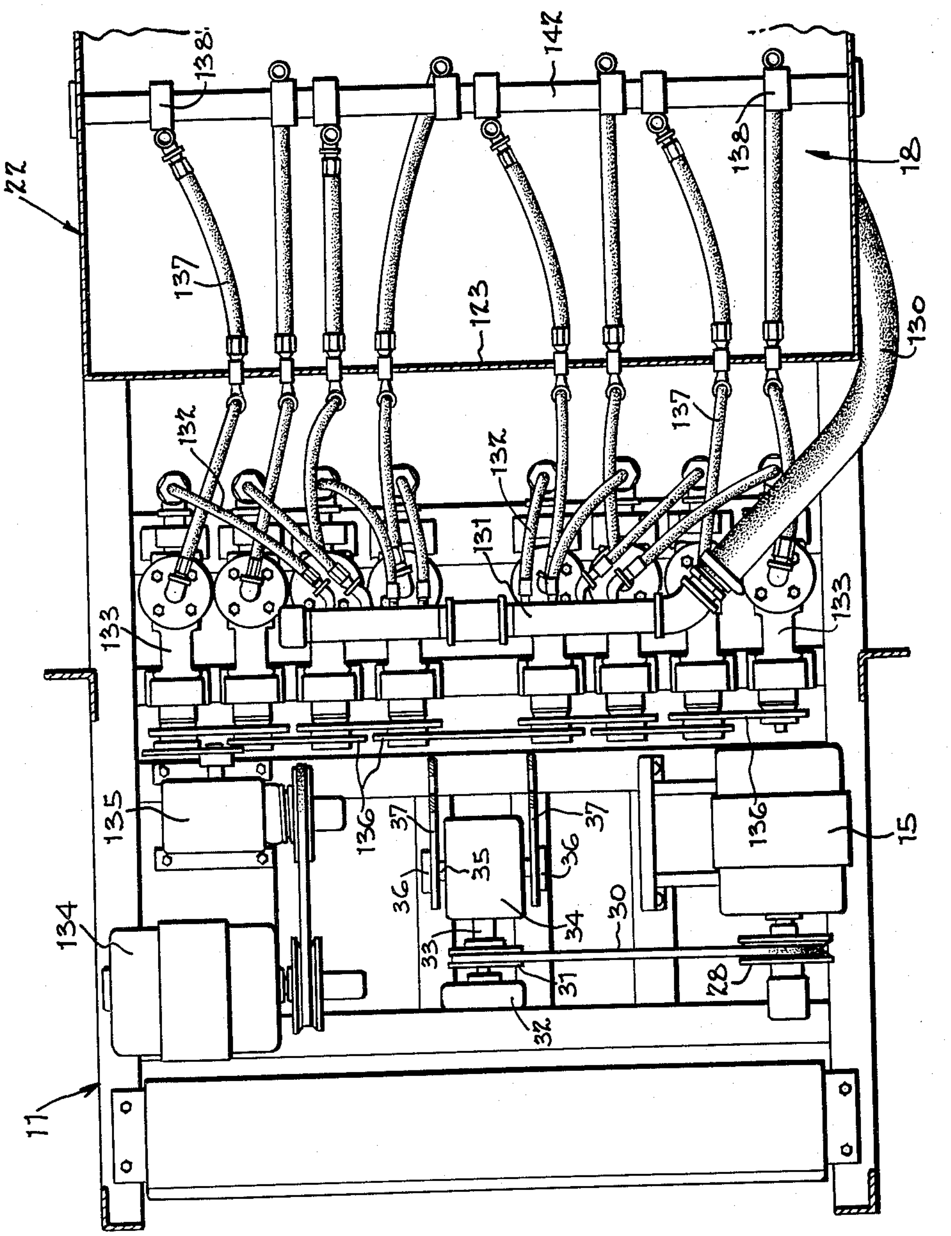
FIGURE 6 is a cross-sectional view taken along line 6—6 of FIGURE 5.

As is best shown in FIGURES 5 and 7, the orientation of the discs functions to provide an extermely uniform application of grease to the pans. The grease thrown off each of the discs leaves in a tangential direction, and due to the angulation of the disc, this grease is thrown off, not only in an upward and forward direction, but also in a rearward and sideward direction. Thus, as the pans are advanced through the machine, all four sides and corners of the pan cavities receive the same even coating of grease applied to the pan bottom.

Any desired type of grease is supplied to the discs through a grease supply system comprising a sump 129 disposed adjacent to the bottom of the machine beneath the rotating discs. Grease is withdrawn from the sump through a suction line 130 and is supplied by the suction line to a manifold 131. Eight inlet tubes 132 interconnect the manifold with eight positive displacement pumps 133. These pumps are driven from a pump motor 134 through a drive including a gear reduction unit 135 and a series of flexible power elements such as chains or belts 136 interconnecting the gear reduction unit and the pump motors.

Grease is forced by each of the pumps through a separate flexible tube 137 which interconnects each pump with its associated discharge tube, or nozzle, 128. As is best shown in FIGURE 8, the open end of nozzle 128 is located at the axis of rotation of a disc and is located within the well 116 of the disc spaced slightly from plate 121 at the bottom of the well. Each of the grease nozzles 128 is adjustably secured in place by means of a mounting arm assembly including a tubular arm 138 adapted to telescopically receive a rod like portion 140 of the nozzle. Rod like portion 140 is slidable within the arm to adjust the spacing at the end of the nozzle from the rotating disc. When properly adjusted, section 140 is secured in place by means of a set screw 141. Tubular arm portion 138 is in turn slidably and rotatably mounted on a transverse rod 142 which extends across the grease spraying chamber. Arms 138 are secured in their correct position by means of suitable set screws 143. By sliding and rotating arms 138 and adjusting nozzle portion 140 relative to arms 138, each nozzle may be positioned so that its grease discharge opening is disposed opposite the center of the well of its associated disc.

Figure 26:
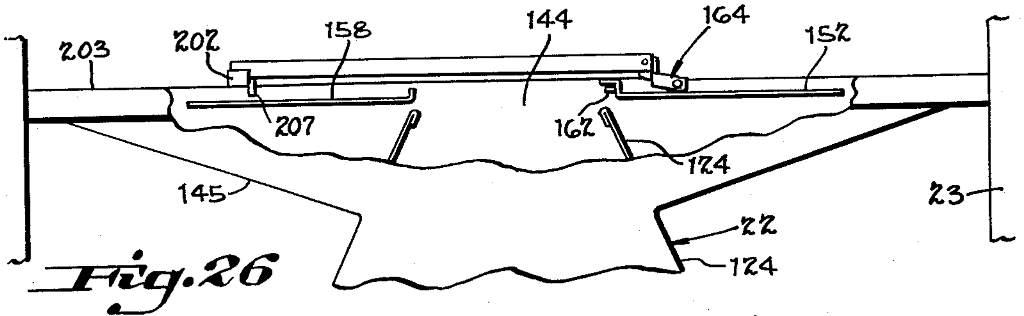
FIGURE 26 is a diagrammatic view similar to FIGURE 25 showing the shutters in the open position.

The conical discs 112 are adapted to break up the grease into minute particles and to project the grease in the form of a mist-like cloud upwardly through an opening 144 provided between adjacent edges of top cover plates 145 and 146. This opening is adapted to be closed by means of sliding shutters, or flaps, 147 and 148 when no pans are disposed above the opening so that grease cannot be sprayed into the room. As explained in detail below, the flaps are shifted to uncover the opening and permit the upward spray of grease only on the forward, or advance, movement of the template, and then only when there is a strap of pans placed over the template. The flaps are closed upon the return stroke of the template and are closed on the advance stroke of the template if there is not a strap of pans placed on the template. However, when pans are properly positioned over the greasing station, the shutters are opened as indicated diagrammatically in FIGURE 26 so that grease discharged from the periphery of the rotating discs is sprayed upwardly into the pan cavities. Grease thus flows from nozzles 128 into wells 116 of the discs where the grease flows outwardly as a film under the influence of centrifugal force and is broken up and distributed by the ridges formed on the surface of the disc. Finally, the grease is thrown tangentially from the periphery of the disc in the form of very minute particles which pass upwardly through the template opening, evenly covering the bottom, side, and end walls of the inverted pans which are carried over the template. Since the grease is thrown backwardly, i.e., toward the loading station, sidewardly and forwardly from the discs, it is effective to evenly coat the bottom, front, side, and rear walls of the pan.

Grease is confined to the spray chamber by angulated walls 123 and 124 which are either formed integral with, or are joined to, cover plates 145 and 146. These walls separate the discs from the motors, pumps, and other equipment and provide elongated drain openings 150 disposed on opposite sides of the opening 144. These latter openings 150 permit grease to drain back into the sump from the surface of plates 145 and 146. Tubular screen members 151 are placed over the drain openings 150 to prevent crumbs or other solid articles from entering the sump.

The construction of shutters 147 and 148 is best shown in FIGURES 5 and 20–28. Forward shutter 148 is disposed adjacent to the discharge end of the machine and comprises a generally flat panel 152 which extends across the machine and is supported upon two angular track members 153 mounted upon opposite side frame members of the machine. The longitudinal side edges of shutter 148 are provided with strips of plastic gasket material 154. The trailing edge of shutter 148 is provided with an upstanding wall 156 and an overturned horizontal flange 157.

Figures 22, 23:
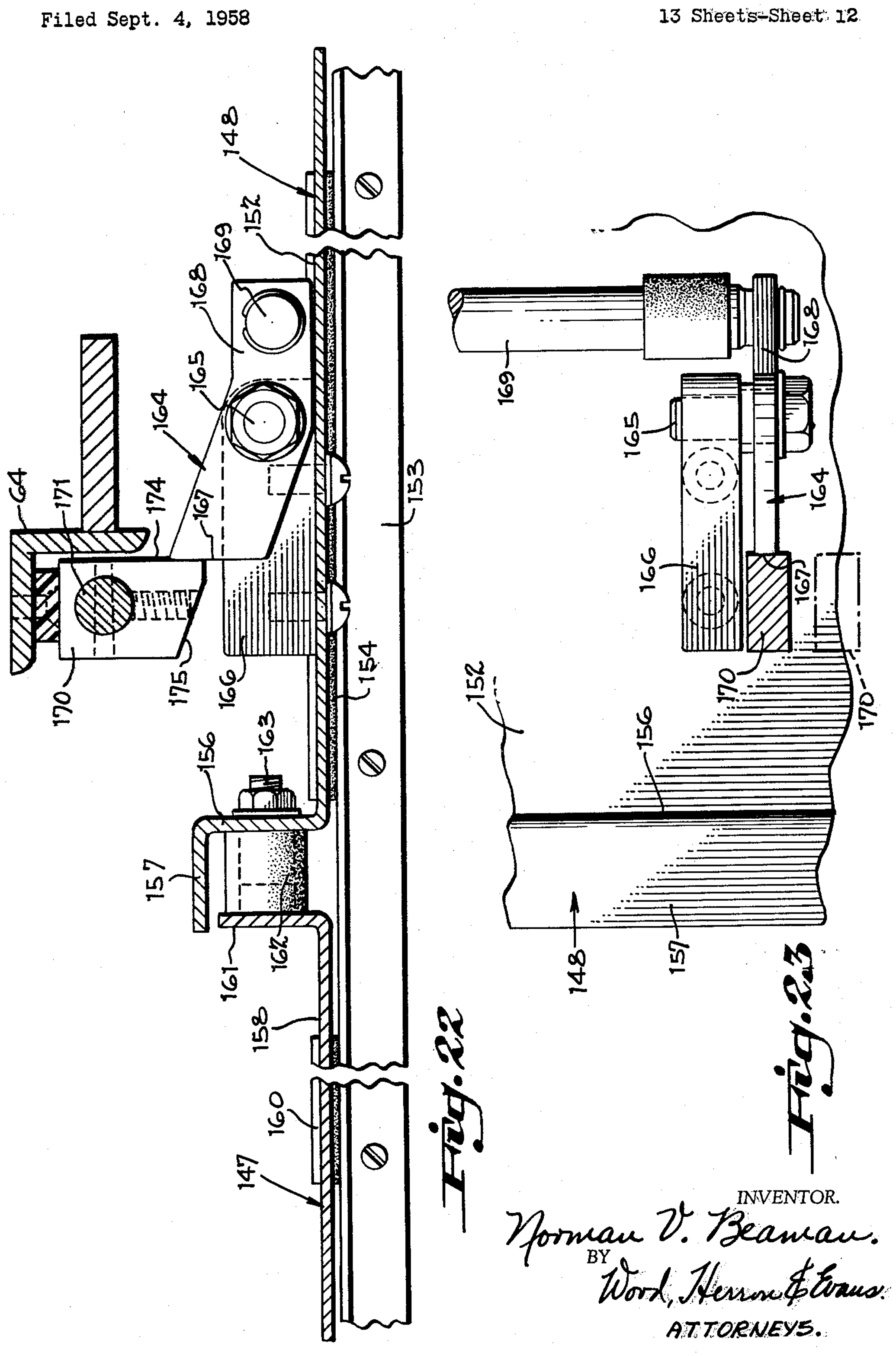
FIGURE 22 is a cross-sectional view taken along line 22—22 of FIGURE 20.
FIGURE 23 is an enlarged top plan view of part of the shutter closure mechanism.

As is best shown in FIGURES 22 and 23, shutter 148 also carries two bumpers preferably in the form of plastic sleeves 162 press fitted over pins 163 which are bolted or otherwise secured to upstanding wall 156. The plastic bumpers thus extend outwardly from wall 156 beneath flange 157 toward shutter 147. Panel 152 of flap 148 also carries two spaced fingers 164. These fingers are pivotally mounted by means of pins 165 journalled in brackets 166 which are bolted or otherwise secured to panel 152. Each of the fingers 164 extends angularly upwardly and includes a vertical rear face 167. Each of the fingers also includes a rearward extension 168 adapted to receive a cross rod 169 interconnecting the fingers for movement in unison.

Rear shutter 147 comprises a flat panel portion 158 which extends across the pan greasing machine and is supported upon the two channel rail strips 153. The longitudinal side edges of panel 158 are also covered with a strip of plastic gasket material 160. The forward, or leading, edge of shutter 147 includes an upstanding wall, or lip, 161. This wall is of lesser height than wall 156 of shutter 148 and is adapted to pass under flange 157 of flap 148 to provide a closure at the juncture of the two flaps when they are positioned as shown in FIGURE 5.

The shutter operating mechanism further includes two depending arms 170 adapted for engagement with fingers 164. These arms are mounted upon a cross rod 171 which is in turn carried beneath the leading edge 64 of the template carrying frame. Cross rod 171 is slidably supported in journal blocks 172 and 173 secured to transverse member 64 in any suitable manner, such as by means of bolts or the like. Each of the arms 170 includes a vertical front face 174 adapted to engage vertical face 167 of finger 164 and a sloping camming face 175 adapted to engage the sloping face of finger 164 to cam that finger downwardly. Arms 170 are spaced apart on rod 171 a distance exactly equal to the spacing of the fingers 164 on shutter member 148.

Figure 14:
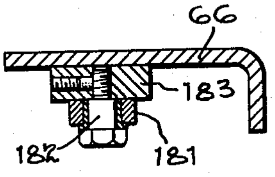
FIGURE 14 is a cross-sectional view taken along line 14—14 of FIGURE 4.

Rod 171 is shiftable to one of two positions; a position in which arms 170 are disposed in transverse registry with fingers 164 so that the arms engage the fingers and are thereby effective to shift the shutter 148; and to an inoperative position in which the rod is shifted transversely so that arms 170 miss fingers 164. Rod 171 is normally spring urged to its operating position, i.e., to the right in FIGURE 4. This is accomplished by means of a spring 176 which is compressed between bearing sleeve 173 and a collar 177 mounted upon shaft 171. Movement of rod 171 to the right is limited by the engagement of right hand arm 170 with a stationary stop 178 carried by transverse member 64. The outer end of rod 171 carries a collar 180 adapted to engage the end of an actuating bar 181. As shown in FIGURES 4 and 14, actuating bar 181 is pivotally mounted intermediate its length upon a pin 182. This pin threadably engages a mounting block 183 which is welded or otherwise secured to side member 66 of the template frame. The opposite end of bar 181 is provided with a yoke 184 disposed for engagement with a collar 185 mounted upon trip rod 186.

Figure 12:
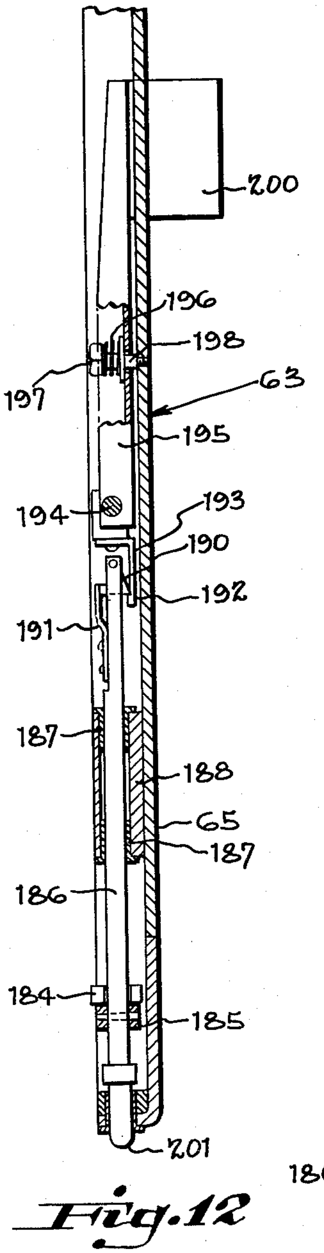
FIGURE 12 is a cross-sectional view taken along line 12—12 of FIGURE 4.
Figure 16:
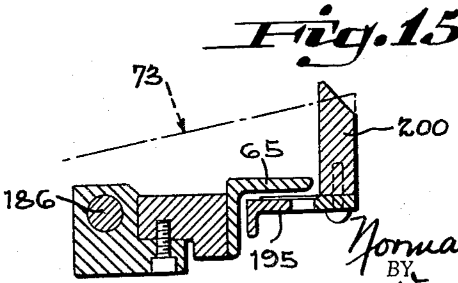
FIGURE 16 is a cross-sectional view taken along line 16—16 of FIGURE 4.

The details of construction of trip rod 186 are best shown in FIGURES 4 and 12. Trip rod 186 extends transversely of the machine and is mounted beneath trailing cross member 63 of the template frame. Trip rod 186 is journalled for sliding movement in bushings 187 disposed within sleeve 188. The inner end of this rod carries a catch 190, the catch being spring urged upwardly by means of a leaf spring 191. The catch is adapted to be latched by a lip 192 formed on latching member 193. The latching member 193 is pivotally mounted upon a pin 194 and is secured in any suitable manner to a tripping bar 195. Tripping bar 195 pivots about pin 194 and is spring urged upwardly by means of a spring 196 compressed between bar 195 and the head 197 of bolt 198, the bolt being threaded into cross member 63, as shown in FIGURE 12. The free end of trip bar 186 carries vertical trip member 200. As best shown in FIGURES 4 and 16, trip member 200 is disposed adjacent to pan pusher 73 and extends upwardly above the upper edge of that member. The outer end 201 of rod 186 is preferably in the shape of a bullet nose an extends outwardly beyond the side of the template carrying frame. This nose 201 of the rod is disposed for engagement with a roller 202 mounted upon side frame member 203 of the machine.

Figures 17, 18, 19:
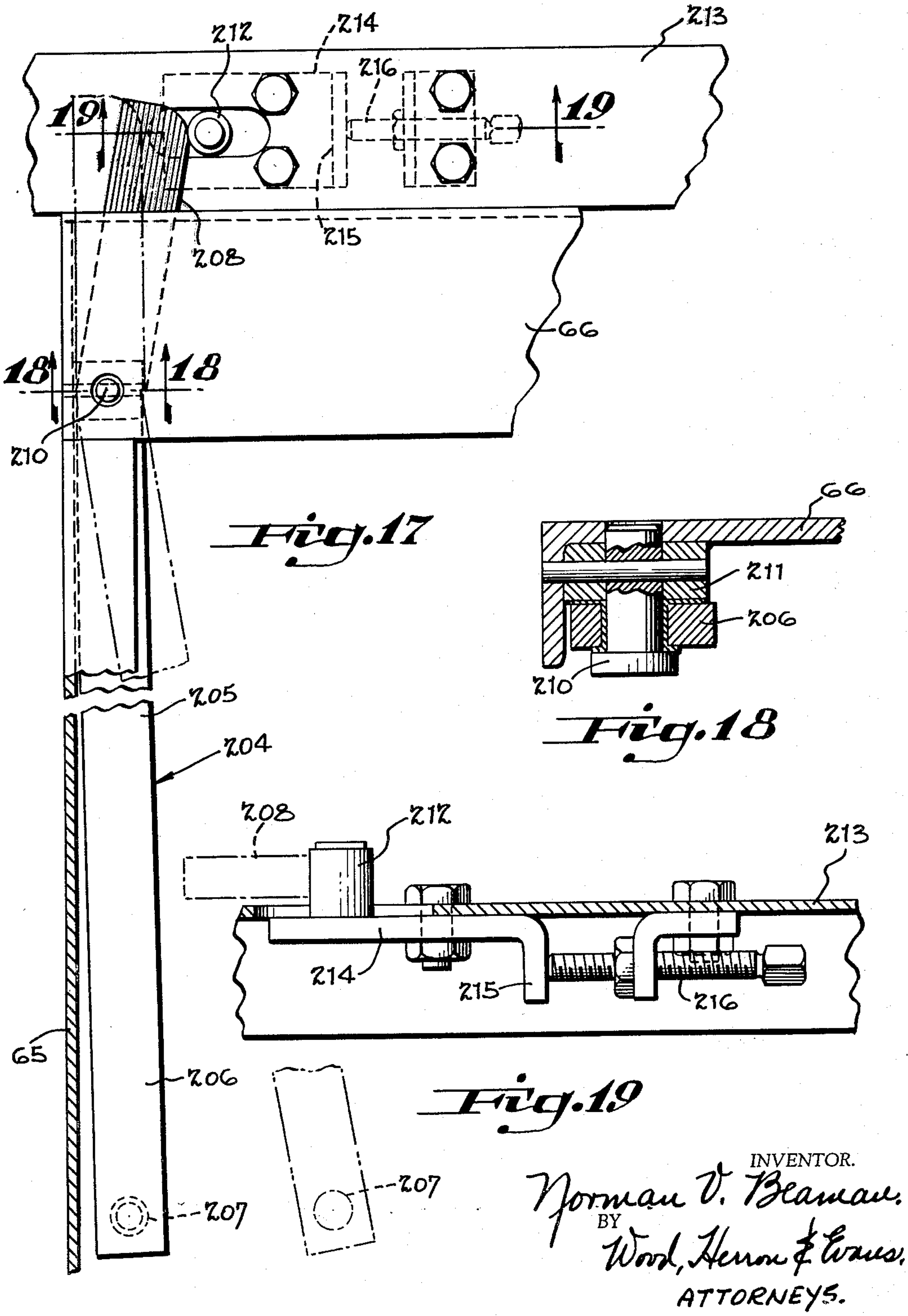
FIGURE 17 is a plan view of the shutter closing mechanism.
FIGURE 18 is a cross-sectional view taken along line 18—18 of FIGURE 17.
FIGURE 19 is a cross-sectional view taken along line 19—19 of FIGURE 17.

In addition to these elements, the shutter actuating mechanism further comprises an overtravel closing mechanism indicated generally by the numeral 204. The details of this mechanism are best seen in FIGURES 4, and 17–19. More particularly, this overtravel mechanism 204 comprises an angulated bar 205 including an elongated push arm 206 extending transversely of the template frame beneath the upper surface thereof. The free end of pusher arm 206 resides substantially halfway across the frame and carries a suitable depending plastic bumper 207. Bar 204 is pivoted intermediate elongated pusher arm 206 and short actuating arm 208. This mounting includes pivot pin 210 mounted beneath side frame member 66 of the template carrying frame. Pivot pin 210 passes upwardly through a mounting block 211 welded or otherwise secured to side member 66, a cross pin being inserted through aligned openings in the mounting block and pivot pin 210 to hold the pivot pin in position. The free end of actuating arm 208 is disposed for engagement with an abutment member 212 extending upwardly from frame member 213 of the machine. The details of this abutment member are best shown in FIGURE 19. As there shown, the abutment member is mounted for longitudinal adjustment. More specifically, abutment member 212 is mounted upon a sliding plate 214 having a depending flange 215 in abutment with an adjusting screw 216, the screw being threaded inwardly or outwardly to permit accurate longitudinal positioning of abutment 212.

In operation, a strap of pans such as that shown in FIGURE 29 is placed in an inverted position upon the pan loading platform 13, the pans resting between longitudinal guide rails 92. Suitable switches (not shown) are actuated to energize main drive motor 15, pump motor 134, and disc drive motors 118. It is to be understood that these motors remain energized throughout the operation of the machine. Longitudinal conveyor chains 42 are driven from main motor 15 through the drive explained in detail above.

Assuming that the first pan pusher 61 has been retracted to the left, at the start of a cycle of operation this pan pusher starts to the right. The vertical face 62 of this member engages the rear edge of a strap of pans. As the pan pusher member 61 pushes the strap of pans to the right from the loading station toward the greasing station, the pans are centered by guide rails 92 and pass under the first set of pan stops 98. Shortly after the rear edge of the pans has cleared these stops, the cross pin 46 of pan advancing mechanism 16, passes around sprocket 38 and starts moving to the left to retract pan pusher 62 toward its initial position at the feeding end of the machine.

As the pan advancing mechanism 16 is retracted, template frame 63 is also retracted toward the loading station. As the template frame 63 nears the end of its return motion, the second pusher member 73 passes beneath the strap of pans previously advanced beyond stops 98. These stops are effective to prevent regressive movement of this strap of pans. When the second pan pusher member passes under the strap of pans, trip member 200, which extends upwardly above the pan pusher, is depressed. The effect of this movement of the trip member is to shift cross rod 171 to its operative position in which arms 170 are in registry with fingers 164 carried by shutter 148.

Figure 28:
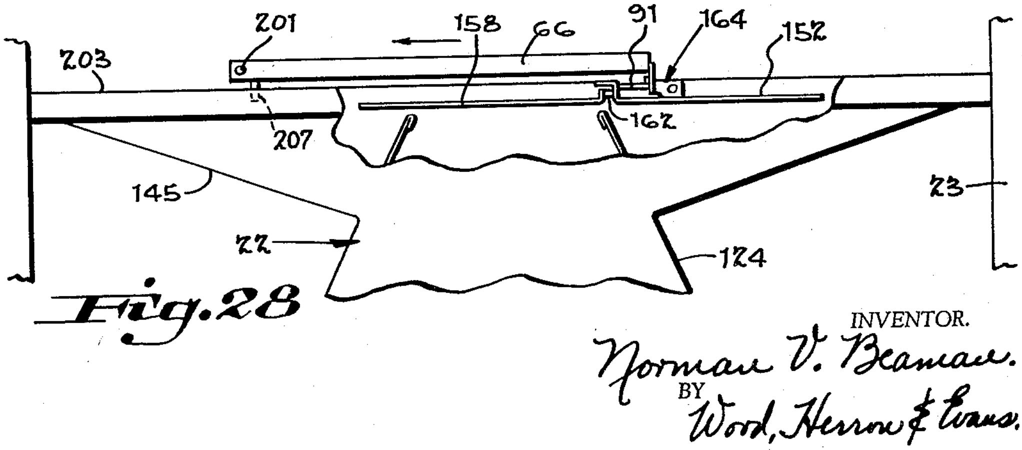
FIGURE 28 is a diagrammatic view showing the shutters on the return stroke of the carirage.

More particularly, upon the return stroke of template frame 63, shutters 147 and 148 are shifted in unison beneath the template to a retracted position, as indicated diagrammatically in FIGURE 28, by the engagement of bumpers 91 carried by returning edge 64 of the template frame with upstanding wall 156 of forward shutter 148. The bumpers 162, carried by shutter 148, in turn engage upstanding wall 161 of shutter 147. These shutters are thus effective to prevent any grease from being sprayed upwardly through the template openings upon the return stroke of the template.

As is explained below, during the preceding advance of the template, bullet nose 201 of trip member 200 engaged roller 202. This roller caused the trip rod 186 to be shifted inwardly whereupon catch 190 was latched behind lip 192. As trip rod 186 was shifted inwardly, collar 185 on that rod engaged yoke 184 of actuating bar 181, causing that bar to pivot about pivotal pin 182. The opposite end of actuating bar 181 was thus shifted outwardly and in turn through its engagement with collar 180 forced cross rod 171 outwardly against the force of spring 176. Cross rod 171 was thus shifted to its inoperative position in which arms 170 are spaced transversely from fingers 164 and consequently were disengaged from these fingers.

On the return stroke of the template, as the trip member passes under a strap of pans positioned to be picked up by the template, the trip member is depressed, pivoting lip 192, and freeing rod 186 to be shifted outwardly. When the rod is free to shift, actuating bar 181 is likewise free to pivot about pin 182 and cross rod 171 is shifted to its active position by spring 176. Thus, arms 170 are again positioned in transverse alignment with fingers 164.

In the next cycle of operation, template frame 63, which had been completely retracted toward the rod end of the machine by its driving engagement with angular bars 55–58, is moved toward the discharge station. The second pan pusher member 73 engages the rear end of a strap of pans, positioning that strap so that the pan cavities are in alignment with the openings in the template. As the template frame is shifted to the right, the pusher member shifts the strap of pans in unison from the template.

Figure 25:
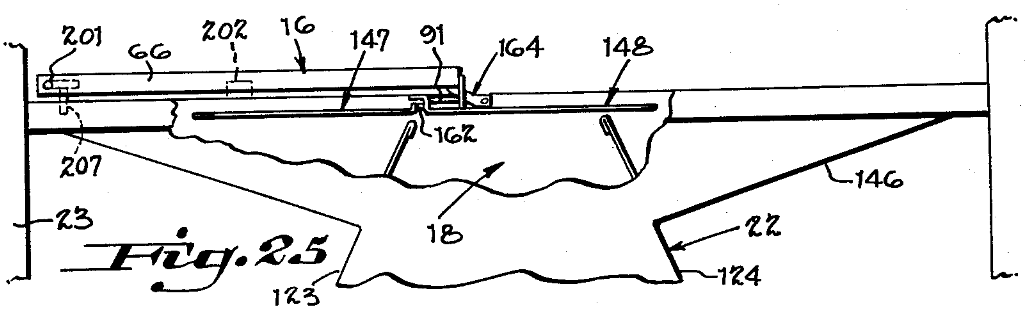
FIGURE 25 is a diagrammatic view of the shutter mechanism at the start of the cycle of operation.

When the template reaches opening 144 at the grease station, arms 170 engage fingers 164, as shown in FIGURES 22 and 25. These arms are thus effective to shift forward flap, or shutter, 148 ahead of the template to permit grease to be sprayed upwardly into the pan cavities through opening 144 and the template openings. As the rear portion of the template passes over the grease opening, depending bumper 207, carried by the pusher section 206 of bar 204, engages upstanding wall 161 of rear flap 147. This flap is thus drawn closed over opening 144, as diagrammatically shown in FIGURE 27.

Figure 27:
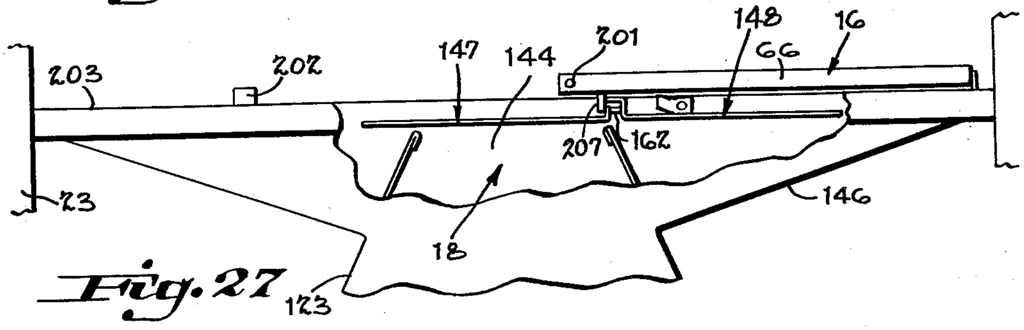
FIGURE 27 is a diagrammatic view similar to FIGURE 26 showing the shutters closed at the extreme advance position of the carriage.

Before the template completes its forward travel, nose 201 of trip member 200 engages roller 202. This causes arms 170 to become disengaged from fingers 164. The forward shutter 148 thus remains stationary while the template passes over it, as shown in FIGURE 27. As the template nears the forward limit of its movement, actuating segment 208 of bar 204 engages stop member 212 and during the last portion of the template movement, this bar 204 is pivoted to the position shown by dotted lines in FIGURE 17. During this pivotal motion, bumper 207 shifts flap 147 a substantially greater distance than the movement of the template. The use of this overarm mechanism thus assures a complete closure of the shutter mechanism together with facilitating a maximum longitudinal extent of grease opening 144.

Also, as the template nears the end of its stroke, the strap of pans is pushed beneath the second set of stops 100 and comes to rest under a draining station 27. Any excess of grease on the pan greasing template drips on cover plate 145 and is returned to the sump.

As the template frame is returned, the third pan pushing member 86 passes beneath the strap of pans which is held against return movement by stops 100. At the same time, bumpers 91 engage the forward wall of shutter 148 carrying the shutters beneath the template to prevent escape of grease, as explained above. In this regard, it will be appreciated that a portion of one of the shutters completely covers the grease opening 144 except on the advance stroke of the template when a pan is inverted over the template. Thus, as is shown in FIGURE 25, in its normal position at the start of a cycle, forward shutter 148 covers opening 144, while at the end of the forward stroke of the template, rear flap 147 covers the opening.

During the next cycle of operation, the trailing pan pusher shifts the strap of pans previously advanced to stops 100, from the draining station onto the unloading table 14 from which the pans are manually removed by an operator.

It will be appreciated that when the greasing machine is in operation, the above outlined operations are performed simultaneously; that is, while one set of pans is being shifted from the loading station to the greasing station, another set of pans is being shifted across the greasing station, and a third set of pans is being moved from the draining station to the unloading table; while an operator is removing a fourth strap of pans from the unloading table. The present machine thus provides an efficient high-speed means of greasing pans in a very uniform manner with a minimum amount of grease.

Having described my invention, I claim:

1. In a machine for greasing baking pans in an inverted position, said machine comprising a pan loading table, a pan discharge table, and walls defining greasing station having an upwardly facing grease opening intermediate the pan loading table and the pan discharge table, pan advancing means effective to engage pans placed on said loading table and to advance said pans in a step-by-step movement from said loading table to said discharge table, a template frame mounted for reciprocating movement over said greasing station and carrying a template adapted to receive the inverted pans, said template being provided with a plurality of openings adapted for registry with cavities in said pans, a plurality of rotating grease atomizing members disposed beneath said template at said greasing station and adapted to project grease by centrifugal force upwardly into the pans, the improvement which comprises a pair of sliding shutter members including a forward shutter and a rear shuter, means slidably supporting said shutter members beneath said template, and means for shifting said shutters relative to said grease opening, said pair of sliding shutters normally residing in abutment with the forward shutter disposed over said grease opening, first means responsive to the presence of a pan upon said template and shiftable with said template carrying frame for engaging the forward shutter and shifting said shutter ahead of said template on the advancement thereof only when a pan is positioned over said template, and second means shiftable with said template frame for engaging said rear shutter and shifting it over said greasing station in trailing relationship to said template.

2. In a machine for greasing baking pans in an inverted position, said machine comprising a pan loading table, a pan discharge table, and walls defining greasing station having an upwardly facing grease opening intermediate the pan loading table and the pan discharge table, pan advancing means effective to engage pans placed on said loading table and to advance said pans in a step-by-step movement from said loading table to said discharge table, a template frame mounted for reciprocating movement over said greasing station and carrying a template adapted to receive the inverted pans, said template being provided with a plurality of openings adapted for registry with cavities in said pans, a plurality of rotating grease atomizing members disposed beneath said template at said greasing station and adapted to project grease by centrifugal force upwardly into the pans, the improvement which comprises a pair of sliding shutter members including a forward shutter and a rear shutter, means slidably supporting said shutter members beneath said template, and means for shifting said shutters relative to said grease opening, said pair of sliding shutters normally residing in abutment with the forward shutter disposed over said grease opening, first means shiftable with said template carrying frame for engaging the forward shutter and shifting said shutter ahead of said template on the advancement thereof when a pan is positioned over said template, said first means being disengaged from said shutter after the template frame passes over the greasing station, and second means shiftable with said template frame for engaging said rear shutter and shifting it over said greasing station in trailing relationship to said template.

3. In a machine for greasing baking pans in an inverted position, said machine comprising a pan loading table, a pan discharge table, and walls defining greasing station having an upwardly facing grease opening intermediate the pan loading table and the pan discharge table, pan advancing means effective to engage pans placed on said loading table and to advance said pans in a step-by-step movement from said loading table to said discharge table, a template frame mounted for reciprocating movement over said greasing station and carrying a template adapted to receive the inverted pans, said template being provided with a plurality of openings adapted for registry with cavities in said pans, a plurality of rotating grease atomizing members disposed beneath said template at said greasing station and adapted to project grease by centrifugal force upwardly into the pans, the improvement which comprises a pair of sliding shutter members including a forward shutter and a rear shutter, means slidably supporting said shutter members beneath said template, and means for shifting said shutters relative to said grease opening, said pair of sliding shutters normally residing in abutment with the forward shutter disposed over said grease opening, first means shiftable with said template carrying frame for engaging the forward shutter and shifting said shutter ahead of said template on the advancement thereof when a pan is positioned over said template, said first means being disengaged from said shutter after the template frame passes over the greasing station, and second means shiftable with said template frame for engaging said rear shutter and shifting it over said greasing station in trailing relationship to said template, and overtravel means for shifting said rear shutter into abutment with said first shutter when the template frame approaches the limit of its advancement.

4. In a pan greasing machine for greasing inverted baking pans, said machine comprising a template adapted to receive inverted pans and means for advancing said template and pans in unison, means for spraying grease through said template openings onto said pans, said means comprising two sets of rotating spray discs adapted to project grease through said template into said pans and means for supplying grease to each of said spray discs, the improvement which comprises disposing said spray discs with the axis of rotation of each of the discs of each set being parallel and being elevated above a horizontal plane, the axis of rotation of each of the discs of each set being disposed at an angle to the longitudinal direction of travel of the template, the axes of rotation of one set of discs being angulated with respect to the axes of rotation of the discs of the other set, whereby grease is atomized and is sprayed both forwardly and backwardly by each disc in the direction of travel of the template.

5. In a pan greasing machine for greasing inverted baking pans, said machine comprising a template adapted to receive inverted pans and means for advancing said template and pans in unison, means for spraying grease through said template openings onto said pans, said means comprising two sets of rotating spray discs adapted to project grease through said template into said pans and means for supplying grease to each of said spray discs, the improvement which comprises disposing said spray discs with the axis of rotation of each of the discs of each set being parallel and being elevated above a horizontal plane, the axis of rotation of each of the discs of each set being disposed at an angle to the longitudinal direction of travel of the template, the axes of rotation of one set of discs being angulated with respect to the axes of rotation of the discs of the other set, whereby grease is atomized and is sprayed both forwardly and backwardly by each disc in the direction of travel of the template, the discs of each set further being offset axially from one another, whereby the discs of each set overlap one another.

6. In a pan greasing machine for greasing inverted baking pans, said machine comprising a template adapted to receive inverted pans and means for advancing said template and pans in unison, means for spraying grease through said template openings onto said pans, said means comprising two sets of rotating spray discs adapted to project grease through said template into said pans and means for supplying grease to each of said spray discs, each of said spray discs comprising a generally conical member, the grease being supplied to the inner surface of said conical member, the improvement which comprises disposing said spray discs with the axis of rotation of each of the discs of each set being parallel and being elevated from a horizontal plane, the axis of rotation of each of the discs of each set being disposed at an angle to the longitudinal direction of travel of the template, the axes of rotation of one set of discs being angulated with respect to the axes of rotation of the discs of the other set, whereby grease is atomized and is sprayed both forwardly and backwardly by each disc in the direction of travel of the template.

7. In a machine for greasing baking pans in an inverted position, said machine comprising a pan loading table, a pan discharge table, and a greasing station intermediate the pan loading table and the pan discharge table, pan advancing means effective to engage pans placed on said loading table and to advance said pans in a step-by-step movement from said loading table to said discharge table, a template mounted for reciprocating movement over said greasing station and adapted to receive the inverted pans, said template being provided with a plurality of openings adapted for registry with cavities in said pans, the improvement which comprises, two sets of rotating spray discs disposed beneath said template at said greasing station and adapted to project grease by centrifugal force upwardly into the pans, the axis of rotation of each of the discs of each set being parallel and being elevated above a horizontal plane, the axis of rotation of each of the discs of each set being disposed at an angle to the longitudinal direction of travel of the template, the axes of rotation of one set of discs being angulated with respect to the axes of rotation of the discs of the other set, whereby grease is atomized and is sprayed both forwardly and backwardly by each disc in the direction of travel of the template, a pair of sliding shutter members, means slidably supporting said shutter members beneath said template, and means including an actuator responsive to the presence of a pan upon said template for shifting said shutters in synchronism with movements of said template, whereby said shutters are spaced from the openings in said template on the advance stroke thereof only when a pan is over said template, and grease is projected from said spray elements through said template openings, and whereby said shutters are positioned at all other times to prevent upward discharge of grease through said template openings.

8. In a pan greasing machine comprising a base supporting a plurality of rotating spray discs, means for supplying grease to said spray discs, a template carrying frame mounted for reciprocating movement over said discs, the improvement which comprises means for confining spray from said discs when the template carrying frame is not disposed over said discs, said means comprising front and rear shutters mounted for sliding movement over said discs, an abutment member carried by said front shutter, and a cooperating arm mounted for movement with said template frame and being adapted to be disposed for engagement with said abutment member for shifting said forward shutter in front of said template frame on the advance movement thereof, and means responsive to the position of a pan upon said template frame for selectively positioning said cooperating arm relative to said abutment member whereby said arm engages said abutment member only when a pan is disposed upon said template.

9. In a pan greasing machine comprising a base supporting a plurality of rotating spray discs, means for supplying grease to said spray discs, a template carrying frame mounted for reciprocating movement over said discs, the improvement which comprises means for confining spray from said discs when the template carrying frame is not disposed over said discs, said means comprising front and rear shutters mounted for sliding movement over said discs, an abutment member carried by said front shutter, and a cooperating arm mounted for movement with said template frame and being adapted to be disposed for engagement with said abutment member for shifting said forward shutter in front of said template frame on the advance movement thereof, and means responsive to the position of a pan upon said template frame for selectively positioning said cooperating arm relative to said abutment member whereby said arm engages said abutment member only when a pan is disposed upon said template, and a second abutment member adapted to engage said rear shutter and shift said rear shutter is unison with and in trailing relationship to said template frame, and a third abutment member movable with said template frame for engagement with a portion of said front shutter to shift said front shutter and said rear shutter in abutment beneath said template frame on the return stroke thereof.

10. In a pan greasing machine comprising a base supporting a plurality of rotating spray discs, means for supplying grease to said spray discs, a template carrying frame mounted for reciprocating movement over said discs, the improvement which comprises means for confining spray from said discs when the template carrying frame is not disposed over said discs, said means comprising front and rear shutters mounted for sliding movement over said discs, an abutment member carried by said front shutter, and a cooperating arm mounted for movement with said template frame and disposed for engagement with said abutment member for shifting said forward shutter in front of said template frame on the advance movement thereof, and a second abutment member adapted to engage said rear shutter and shift said rear shutter in unison with and in trailing relationship to said template frame, and a third abutment member movable with said template frame for engagement with a portion of said front shutter to shift said front shutter and said rear shutter in abutment beneath said template frame on the return stroke thereof, and spring urged means for shifting said arm transversely out of alignment with said abutment after said template frame has passed over said discs.

11. In a pan greasing machine comprising a base supporting a plurality of rotating spray discs, means for supplying grease to said spray discs, a template carrying frame mounted for reciprocating movement over said discs, the improvement which comprises means for confining spray from said discs when the template carrying frame is not disposed over said discs, said means comprising front and rear shutters mounted for sliding movement over said discs, an abutment member carried by said front shutter, and a cooperating arm mounted for movement with said template frame disposed for engagement with said abutment member for shifting said forward shutter in front of said template frame on the advance movement thereof, and a second abutment member adapted to engage said rear shutter and shift said rear shutter in unison with and in trailing relationship to said template frame, and a third abutment member movable with said template frame for engagement with a portion of said front shutter to shift said front shutter and said rear shutter in abutment beneath said template frame on the return stroke thereof, and spring urged means for shifting said arm transversely out of alignment with said abutment after said template frame has passed over said discs, and means responsive to the position of a pan upon said template frame for repositioning said arm in alignment with said abutment on the next advancement of said template frame.

References Cited in the file of this patent

UNITED STATES PATENTS

| | | |
|---|---|---|
| 2,741,214 | Tench et al. | Apr. 10, 1956 |
| 2,903,998 | Beaman | Sept. 15, 1959 |